US010963324B2

(12) United States Patent
Acosta

(10) Patent No.: US 10,963,324 B2
(45) Date of Patent: Mar. 30, 2021

(54) PREDICTIVE MICROSERVICE SYSTEMS AND METHODS

(71) Applicant: Citrix Systems, Inc., Fort Lauderdale, FL (US)

(72) Inventor: Rodney Gallart Acosta, Plantation, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/217,176

(22) Filed: Dec. 12, 2018

(65) Prior Publication Data

US 2020/0192732 A1   Jun. 18, 2020

(51) Int. Cl.
  *G06F 3/00* (2006.01)
  *G06F 9/54* (2006.01)
  *G06F 16/245* (2019.01)

(52) U.S. Cl.
  CPC ............. *G06F 9/547* (2013.01); *G06F 9/546* (2013.01); *G06F 16/245* (2019.01)

(58) Field of Classification Search
  CPC .................................................. G06F 9/541
  USPC ........................................................ 719/328
  See application file for complete search history.

(56) References Cited

U.S. PATENT DOCUMENTS 10,387,426 B2 * 8/2019 Singh ................... G06F 21/602
10,425,350 B1 * 9/2019 Florissi ................. H04L 43/065
2003/0189578 A1 * 10/2003 Alcorn ..................... H04N 9/75
    345/629
2018/0113940 A1 * 4/2018 Mora Lopez ............ G06F 9/46
2018/0219863 A1 * 8/2018 Tran ....................... H04L 63/10
2018/0270107 A1 * 9/2018 Nassar ............... H04L 41/0677

OTHER PUBLICATIONS

Davy Preuveneers, Access Control with Delegated Authorization Policy Evaluation for Data-Driven Microservice Workflows. (Year: 2017).*
J T Zhao, Management of API Gateway Based on Micro-service Architecture. (Year: 2018).*
Mar. 16, 2020—(WO) Written Opinion of the International Searching Authority—App PCT/US2019/064942.
Adler RM "Distributed Coordination Models for Client/Server Computing" Computer, IEEE Computer Society, USA, vol. 28, No. 4, Apr. 1, 1995 (Apr. 1, 1995), pp. 14-22.

* cited by examiner

*Primary Examiner* — Lechi Truong
(74) *Attorney, Agent, or Firm* — Banner & Witcoff, Ltd.

(57) ABSTRACT

Methods and systems for predictive execution of microservices. Execution of an application program interface request may entail execution of a plurality of microservices in a series. An events message may be transmitted to an events queue corresponding to the API request. The message may be based on an operating status of one or more microservices. Based on the events message, one or more of the microservices in the series may be configured to perform early execution steps before receiving an internal message from a previous microservice in the series. Such early execution steps may comprise authenticating a user and/or a microservice, retrieving and/or caching data, or the like. The one or more of the microservices may perform subsequent execution steps after receiving an internal message from a previous microservice in the series.

18 Claims, 7 Drawing Sheets

PREDICTIVE MICROSERVICE SYSTEMS AND METHODS

FIELD

Aspects described herein generally relate to computers and computer networks. In particular, aspects described herein relate to microservices, computer software, computer architecture, computing protocols, and the like.

BACKGROUND

Microservices—small services which collectively may be executed as part of an application—are increasingly popular. Microservices have a number of benefits over traditional computing software, including being readily implemented in a technology-independent manner, relatively easily programmed and modified, and are often more easily implemented on distributed computing networks.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations that will be apparent upon reading and understanding the present specification, aspects described herein are directed towards predictive execution of microservices. Microservices may be any portion of a larger application or service such that, for example, each microservice may perform one or more application functions of a plurality of application functions required to perform one or more tasks. A microservice executing on one or more computing devices receive an application program interface (API) request. The API request may be, for example, a request for a list of files associated with a user on a server. The API request may be associated with execution of a plurality of microservices in a series. While some microservices may be executed in parallel (e.g., at substantially the same time), other microservices may be executed in series (e.g., such that a second microservice executes after a first microservice). With regard to microservices in a series, a first microservice in a series may cause a second microservice in the series to execute using, e.g., an internal message, such as an internal API call. For example, a first microservice may fully execute, then transmit an internal message to a second microservice, and the internal message may cause the second microservice to perform one or more actions. Based on determining that the API request corresponds to execution of microservices in a series, a computing device may transmit, to an events queue, an events message corresponding to the API request. The events message may indicate information about the API request such as the identity of the API request, one or more microservices which may perform the API request, or the like. Microservices in the series may be configured to retrieve events messages from the events queue and, based on the events messages in the events queue, execute before receiving an internal message from a first microservice. Execution of a microservice may comprise performing one or more steps, such as retrieving, analyzing, and/or transmitting data. Microservice execution may comprise retrieving input from previous microservices and/or providing output to subsequent microservices. As such, microservices in a series which may ordinarily wait to receive an internal message from another microservice may, based on events messages, execute and perform early execution steps before receiving the internal message. Early execution steps may comprise any processing performed by or with respect to a microservice which may be performed before receiving an internal message from a previous microservice. Such early execution steps may comprise authenticating the microservice and/or a user, caching data, retrieving data for later execution and/or later microservices, retrieving data associated with a user account, or the like. Because microservices in the series may perform early execution steps before receiving internal messages, the speed of the execution of the microservices in the series may be faster than if each microservice in the series executed only when it has received an internal message.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards execution of microservices. The popularity of microservices has made them increasingly attractive in computer application development, particularly where microservices enable execution of an application across multiple computing devices. But the step-by-step nature of microservice execution (e.g., the process of executing a first microservice, then one or more second microservices after the first, and so on) may introduce undesirable delay in application execution. For example, a subsequent microservice may depend on output from an earlier microservice, such that the subsequent microservice may wait until the earlier microservice is complete before performing any execution steps. As such, the modularity of microservices, while beneficial in many respects, may introduce undesirable delays.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
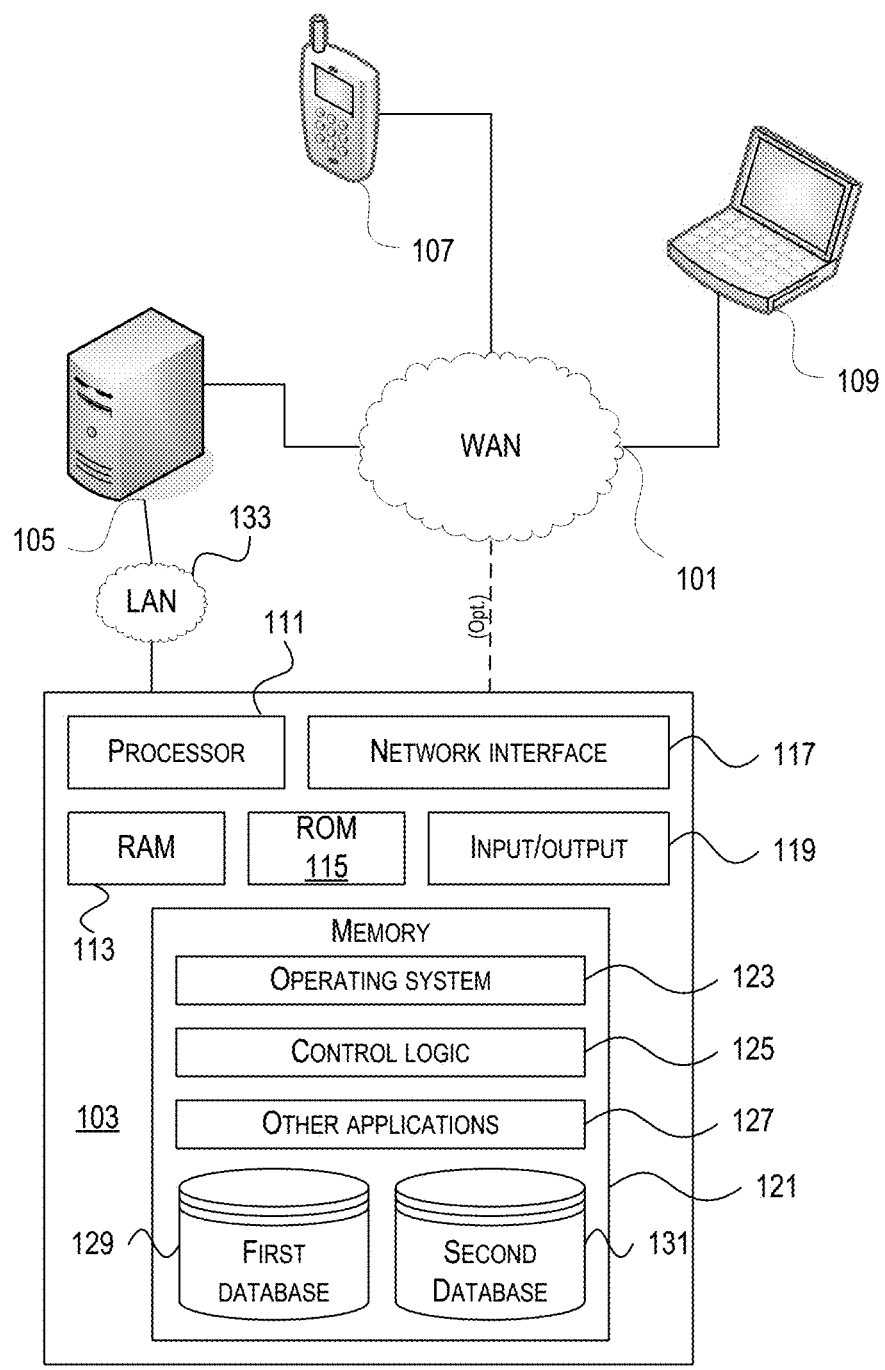
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. The wide area network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. The first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
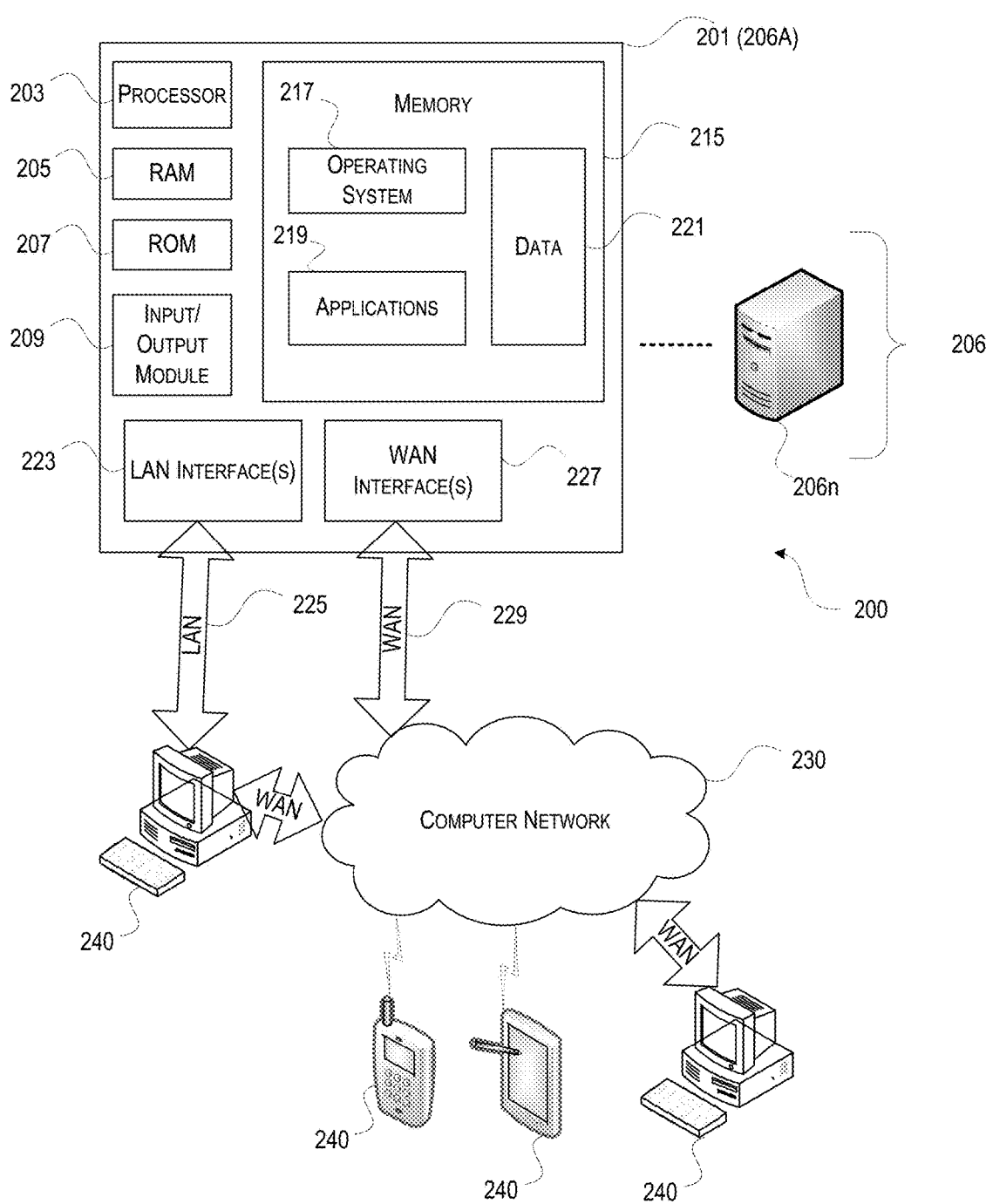
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the computing device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). The computing environment 200 may include a network appliance installed between the server(s) 206 and client device(s) 240. The network appliance may manage client/server connections, and in some cases can load balance client connections amongst a plurality of backend servers 206.

The client device(s) 240 may be referred to as a single client machine 240 or a single group of client devices 240, while server(s) 206 may be referred to as a single server 206 or a single group of servers 206. A single client machine 240 may communicate with one or more servers 206 and/or one or more client machine 240.

A client machine 240 may be referenced by any one of the following non-exhaustive terms: client machine(s); client(s); client computer(s); client device(s); client computing device(s); local machine; remote machine; client node(s); endpoint(s); or endpoint node(s). The server 206 may be referenced by any one of the following non-exhaustive terms: server(s), local machine; remote machine; server farm(s), or host computing device(s).

The client machine 240 may be a virtual machine. The virtual machine may be any virtual machine, and the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

The client machine 240 may display application output generated by an application remotely executing on a server 206 or other remotely located machine. The client machine 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206 may use a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 may communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. The server farm 206 may be administered as a single entity or may include multiple server farms.

A server farm may include servers 206 that execute a substantially similar type of operating system platform (e.g., WINDOWS, UNIX, LINUX, iOS, ANDROID, SYMBIAN, etc.) The server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

A first server 206a may receive requests from a client machine 240, forward the request to a second server 206b (not shown), and respond to the request generated by the client machine 240 with a response from the second server 206b (not shown). First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., the wide area network 101.

Figure 3:
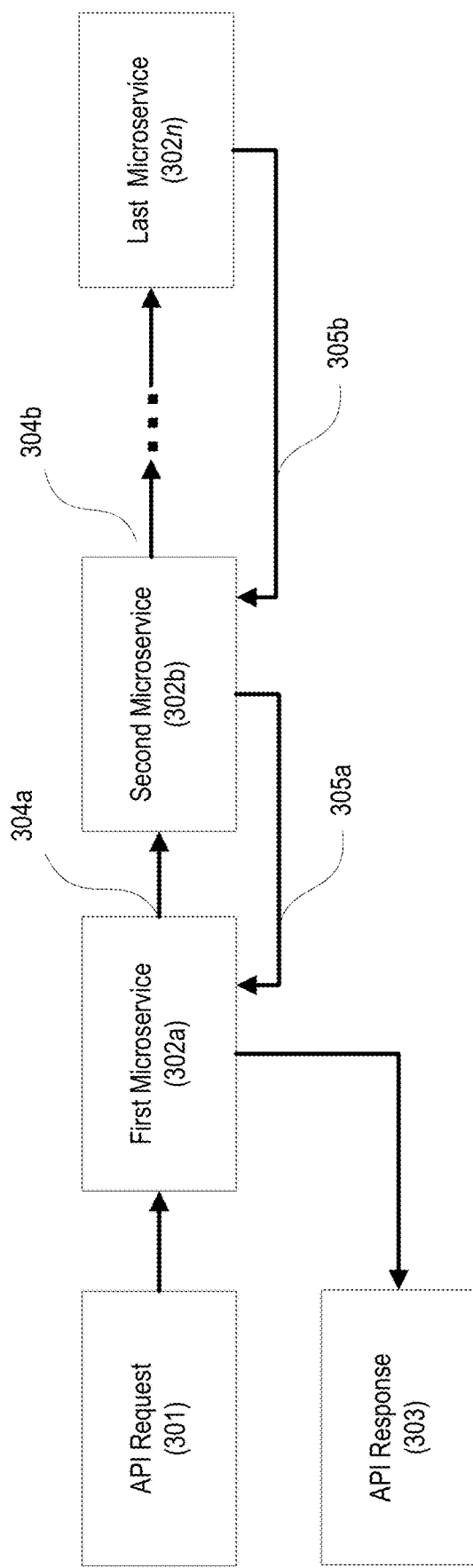
FIG. 3 depicts an illustrative API call involving a plurality of microservices in series.

FIG. 3 depicts an illustrative API call involving a plurality of microservices in series. An API request 301 is shown causing execution of a first microservice 302a, a second microservice 302b, and subsequent microservices until last microservice 302n, all in series. Other microservices (not shown) may be executed in series and/or parallel with any of the microservices 302a-302n, and the microservices 302a-302n are shown in a single series for simplicity. Each microservice 302a-302n may transmit to prior and subsequent microservices, such that the API response 303 may be returned by the first microservice 302a after, e.g., the second microservice 302b receives an internal API message 305b from the last microservice 302n, and the first microservice 302a receives an internal API response 305a from the second microservice 302b. In this way, the API request 301 may be sent to the first microservice 302a, and the API response 303 may be received from the first microservice 302a, and other processes (e.g., other computing devices transmitting the API request 301 and/or receiving the API response 303) need only correspond with a single microservice. For example, ensuring that API requests, such as the API request 301, and API responses, such as the API response 303, are only sent and received from a single microservice (e.g., the first microservice 302a) may allow the other microservices to be private and/or more secure and/or may allow programmers to avoid putting particular functionality (e.g., functionality allowing a microservice to transmit a particular format of API response) in more than one microservice.

The microservices 302a-302n may depend on internal messages from prior and/or subsequent microservices for certain execution steps. Such internal messages may comprise any transmissions between microservices, such as a transmission of data, an indication that one or more microservices have completed one or more processing steps, or the like. For example, the second microservices 302b may execute upon receiving internal message 304a, and the last microservice 302n may execute upon receiving an internal message (e.g., internal message 304b). The output of previous microservices may be a dependency of execution of subsequent microservices. For example, the first microservice 302a may be configured to determine a username, and the second microservice 302b may be configured to access a website and authenticate a user using the username, such that the second microservice 302b may be incapable of executing until the first microservice 302a is complete. Microservices may be configured to perform steps that need not require output from a previous microservice. For example, returning to the previous example, the second microservice 302b may be able to access the website without the username, and may need the username only to perform the aforementioned authentication step. As such, undesirable delay may arise: for example, if the second microservice 302b waits on the internal message 304a until performing any execution steps, it may delay execution of steps that could be performed at any time (e.g., accessing the aforementioned website) because they do not depend on output from the first microservice 302a. Though the microservices 302a-302n are depicted in a single series, a microservice may be dependent on one or more previous or subsequent microservices. For example, a single microservice may depend on the output of four prior microservices, and/or one or more microservices may loop such that a subsequent microservice provides output to a prior microservice, which may then provide second output to the subsequent microservice. As such, microservices may be configured in a series, in parallel, in a grid, or any other configuration as desired.

As a simplified example of how the microservices 302a-302n may operate in FIG. 3, the API request 301 may correspond to, for example, a request for a webpage of a password-protected website. The first microservice 302a may be configured to receive the API request 301, retrieve login information (e.g., an indication of a username and/or an indication of a password) for a user associated with the API request 301, and transmit it in the internal message 304a to the second microservice 302b. The second microservice 302b may be configured to retrieve a login page of the website and perform authentication steps using the login information, then transmit an acknowledgement of authentication in the internal message 304b to the last microservice 302n. The last microservice 302n may be configured to, based on the acknowledgement of the authentication, retrieve webpage data and pass it back to the first microservice 302a, which may transmit the webpage data as the API response 303. The second microservice 302b may not retrieve the login page of the website until receiving the internal message 304a from the first microservice 302a. As such, there may be a delay in the execution of the second microservice 302b.

Predictive Microservices Execution

Figure 4:
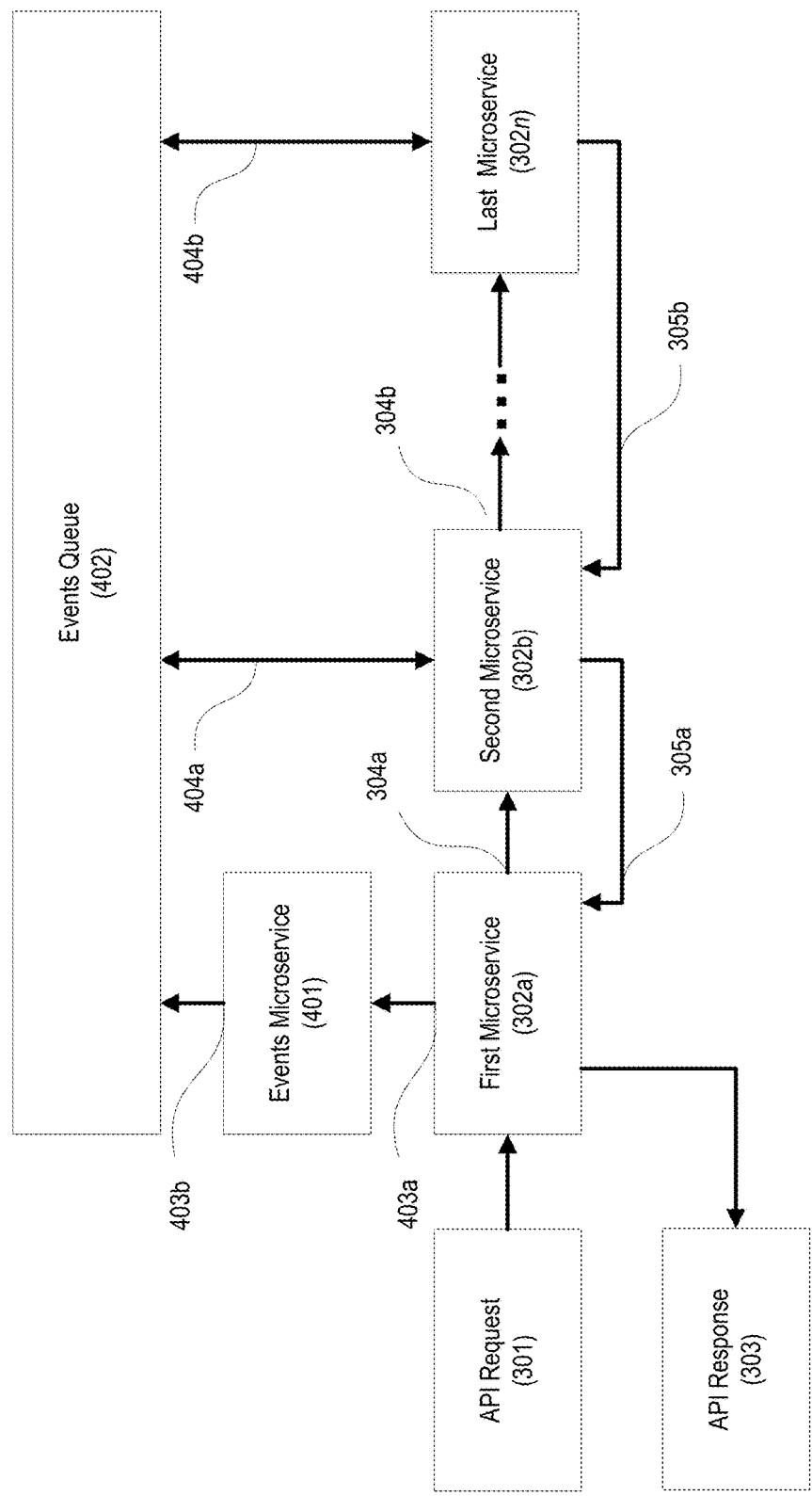
FIG. 4 depicts an illustrative API call involving a plurality of microservices in series and an events queue.

FIG. 4 depicts an illustrative API call involving a plurality of microservices in series, like that of FIG. 3, and an events queue 402 has been added. The events queue 402 depicted in FIG. 4 may be a computing device (e.g., a database) and/or process executing on a computing device configured to receive, store, and transmit internal messages to microservices. In FIG. 4, the API request 301, the first microservice 302a, the second microservice 302b, the last microservice 302n, the API response 303, the internal message 304a, and the internal message 304b may be the same as shown in FIG. 3. The first microservice 302a may transmit an events message 403a corresponding to the API request 301 to the events microservice 401, which may be configured to send an events message 403b to the events queue 402. The events message 403b may correspond to the events message 403a, such that the two messages may be similar but need not be identical. For example, the events message 403b may be transmitted based on the events microservice 401 receiving the events message 403a, but data contained in the events message 403b may be a subset of the data contained in the events message 403a. The events queue 402 may be configured to receive, store, and/or transmit internal messages, such as the events message 403b. Microservices, such as the second microservice 302b and the last microservice 302n, may be configured to send and receive messages to and from the events queue 402, as depicted by arrow 404a and arrow 404b.

The events microservice 401 may be communicatively coupled to the first microservice 302a such that internal messages may be transmitted to the events queue 402 prior to transmission of internal messages from the first microservice 302a (e.g., the internal message 304a). Additionally and/or alternatively, the first microservice 302a may be communicatively coupled to the events queue 402, such that the first microservice 302a may perform all steps described with respect to the events microservice 401. Additionally and/or alternatively, the events microservice 401 may, but need not be communicatively coupled to the first microservice 302a. For example, the events microservice 401 may be communicatively coupled to the second microservice 302b.

The events message 403a and the events message 403b, may comprise information about the API request 301. For example, the events message 403a and/or the events message 403b may comprise an identification of a type or time associated with the API request 301. As another example, the events message 403a and/or the events message 403b may comprise information about one or more microservices required by the API request 301, dependencies associated with the API request 301, or the like. The events message 403a and/or the events message 403b may indicate that the API request 301 has been received. For example, the events message 403a and/or the events message 403b may comprise an identity of the API request 301, and the events queue 402 may query a database using the identity to determine one or more internal messages to transmit to microservices based on the API request 301. Though the events message 403a and the events message 403b are shown separately in FIG. 4, a single events message may be transmitted from the first microservice 302a to the events queue 402. The events message 403a and the events message 403b need not be the same. For example, the events message 403a may contain a significant amount of data about the API request 301, and the events microservice 401 may determine that the microservices need only a portion of the data and remove all but the portion of data needed by the microservices. For example, only data needed by particular microservices may be transmitted in the events message 403b. This may advantageously increase the speed with which the events message 403b is stored and transmitted to microservices.

As shown by the arrow 404a and the arrow 404b, the microservices 302a-302n may be configured to retrieve events messages from the events queue 402, and/or the events queue 402 may be configured to transmit new events messages to the microservices 302a-302n. For example, the second microservice 302b may be configured to query the events queue 402 for events messages. Such queries may be transmitted on a periodic basis, e.g., such that a microservice currently not executing any steps may query the events queue 402 more quickly as compared to a microservice currently executing one or more steps. The microservices may be configured to transmit a request for events messages to the events queue 402, and the events queue 402 may be configured to, in response to the request, transmit events messages to the microservices. The events queue 402 may be configured to transmit events messages to one or more microservices without receiving a request. For example, the events queue 402 may send new events messages to microservices when such events messages are received. Retrieval of events messages from the events queue 402 may be performed using the same or different mechanisms with which microservices transmit internal messages, such as the internal message 304a and the internal message 304b. For example, the microservices may transmit requests to and/or receive events messages from the events queue 402 over a network.

The microservices 302a-302n may be configured to, based on events messages (e.g., the events message 403b) in the events queue 402, perform early execution steps. Early execution steps may comprise any form of execution which does not depend on output from a previous microservice, though such early execution steps may depend on information contained in events messages in the events queue. Early execution steps may be early in that they are performed before subsequent execution steps which do depend on internal messages from a previous microservice. For example, the second microservice may perform early execution steps before receiving the internal message 304a, and then perform different, later execution steps after receiving the internal message 304a. The microservices 302a-302n may be configured to, based on one or more events messages in the events queue 402, authenticate one or more microservices. For example, the one or more events messages in the events queue 402 may comprise authentication data (e.g., a username associated with the API request 301), and the second microservice 302b may use the authentication data to authenticate itself with a service of a different computing device. For example, the service may be a banking service on a different computing device, and the authentication data may be used to authenticate access, by the microservice, to a checking account supported by the banking service. As another example, the one or more events messages in the events queue 402 may comprise a username, and the second microservice 302b may use the username to retrieve data from a storage device associated with an account associated with the username. For example, the microservice may use the username to retrieve, from an external database, an Internet Protocol (IP) address associated with the username. The microservices 302a-302n may be configured to, based on one or more events messages in the events queue 402, cache data from a storage device. For example, the one or more messages in the events queue 402 may comprise information about the API request 301 and, based on the information, the second microservice 302b may cache information from a storage device that it may need to perform one or more steps relating to the API request. As a particular example, the API request 301 may be to cause display of a webpage, and caching the information may comprise retrieving images for use on the webpage from an external storage device.

The microservices 302a-302n may be configured to produce output based on the early execution steps, which may cause other microservices of the microservices 302a-302n to perform early execution steps. For example, a first microservice 302a may perform early execution steps comprising authenticating the first microservice 302a with an external server and, based on the successful authentication, the first microservice 302a may transmit, to a second microservice 302b, output which causes the second microservice 302b to perform early execution steps comprising retrieving data from the external server.

As also shown by arrow 404a and arrow 404b, microservices 302a-302n may directly transmit events messages to the events queue 402, which may cause other microservices to perform early execution steps. For example, the second microservice 302b may transmit a new events message to the events queue 402, which may cause the last microservice 302n to perform additional early execution steps. In this manner, microservices may internally communicate with one another using events messages in the events queue 402 before other internal messages (e.g., the internal message 304a and/or the internal message 304b) are received at respective microservices (e.g., the second microservice 302b and the last microservices 302n). For example, the last microservice 302n may perform a first set of early execution steps (e.g., accessing a log-in page of a website) based on the events message 403b, and may perform a second set of early execution steps (e.g., logging into the log-in page using authentication credentials) based on a different events message in the events queue 402 from the second microservice 302b. As yet another example, a microservice may wait to perform early execution steps until both an events message corresponding to an API request (e.g., the events message 403b) and one or more additional events messages (e.g., an additional events message transmitted from the second microservice 302b to the events queue 402) are present in the events queue 402.

The events message 403a and the events message 403b may be transmitted based on an operating status of one or more of the microservices 302a-302n. The operating status may correspond to the available processing resources of the one or more of the microservices 302a-302n such that, for example, an operating status may indicate that a microservice is busy, free, that a particular percentage of its processing resources (e.g., processor threads assigned to the microservice) are occupied, or the like. The events microservice 401 may determine whether to transmit the events message 403b to the events queue 402 based on an operating status of one or more of the microservices 302a-302n. For example, if the second microservice 302b is busy such that it cannot perform early execution steps before receiving output from the first microservice 302a, transmitting the events message 403b to the events queue 402 may be skipped because it may have a negligible benefit on execution time. As another example, the events microservice 401 may be configured to track the execution times of microservices when such microservices perform early execution steps and/or other execution steps. If, in such an example, the average time it takes for the second microservice 302b to perform early execution steps exceeds a predetermined threshold, transmitting the events message 403b to the events queue 402 may be skipped because it may negatively impact execution time. The events microservice 401 may transmit the events message 403b to the events queue 402 based on determining that an estimated processing time associated with the API request 301 exceeds a threshold. For example, if the estimated processing time would be improved by transmitting the events message 403b to the events queue 402 and causing one or more microservices to perform early execution steps, the events message 403b may be transmitted. As another example, if the estimated processing time across all of the microservices 302a-302n is negligible, use of the events queue may introduce additional unnecessary processing which may in fact negatively impact execution time, so the events message 403b need not be transmitted.

As a simplified example of how the microservices 302a-302n may operate in FIG. 4, as with the example provided for FIG. 3, the API request 301 may correspond to, for example, a request for a webpage of a password-protected website. The first microservice 302a may be configured to receive the API request 301, retrieve login information for a user associated with the API request 301, and transmit it in the internal message 304a to the second microservice 302b. The first microservice 302a may further be configured to transmit the events message 403a (e.g., containing login information such as a username and password, an identity of the webpage the user wants to access, and a time that the API request 301 was transmitted, or the like) to the events microservice 401, which may then transmit the events message 403b (e.g., containing the same or different information as compared to the events message 403a) to the events queue 402. The second microservice 302b may, before receiving the internal message 304a, detect the events message 403b in the events queue 402 and may perform early execution steps, such as retrieving a login page of the website. Similarly, the last microservice 302n may, based on the events message 403b, cache one or more portions of a requested webpage before receiving the internal message 304b. For example, the last microservice 302n may, based on a Uniform Resource Locator (URL) in the events message 403b, cache Cascading Style Sheet (CSS) data associated with the URL, and retrieve additional webpage data associated with the URL after receiving the internal message 304b. As another example, the last microservice 302n may, based on a URL in the events message 403b, download one or more images (e.g., background images, header logos) associated with the URL and retrieve additional webpage data associated with the URL after receiving the internal message 304b. Then, the process formerly described with respect to FIG. 3 may then proceed much more quickly. When the second microservice 302b receives the internal message 304a from the first microservice 302a, it may then more quickly transmit an acknowledgement in the internal message 304b to the last microservice 302n because it has already performed certain authentication steps (e.g., retrieving a login page needed to perform the authentication) in advance. Similarly, the last microservice 302n may more quickly retrieve webpage data and transmit it back to the first microservice 302a for inclusion in the API response 303, as it had already retrieved portions of the webpage data in advance.

The events microservice 401 need not be implemented for the first microservice 302a to transmit events messages (e.g., the events message 403a and/or the events message 403b) to the events queue 402. For example, some or all of the functions described with respect to the events microservice 401 may be performed by the first microservice 302a. It may be desirable to implement the events microservice 401 separately to, e.g., avoid having the first microservice 302a perform some steps (e.g., monitoring execution times, removing data from the events message 403a to create the events message 403b) which may delay other steps of the first microservice 302a. For example, by implementing some steps with respect to the events queue 402 in events microservice 401 instead of the first microservice 302a, the first microservice 302a may be freed up for other steps, such that an overall processing time associated with the API request 301 may be lessened.

Figure 5:
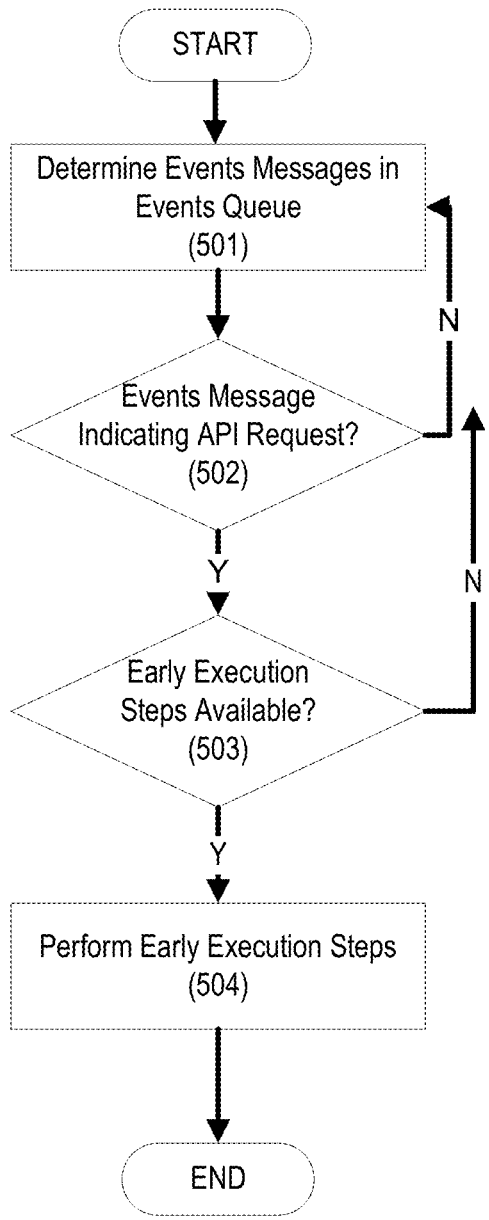
FIG. 5 depicts a flow chart which may be performed by a microservice.

FIG. 5 is a flow chart depicting steps which may be performed by a microservice and with respect to an events queue, such as the microservices and the events queue 402 depicted in FIG. 4. In step 501, messages in the events queue 402 may be determined. Determining the events messages in the events queue 402 may comprise requesting messages from the events queue 402 (e.g., by querying the events queue 402) and/or by receiving events messages transmitted from the events queue 402. The microservice may determine a plurality of events messages, such as events messages corresponding to different API requests.

The events queue 402 may be queried (e.g., by one or more microservices, such as the first microservice 302a) to receive events messages. Querying the events queue 402 may comprise retrieving messages from the events queue 402 by transmitting a request for a list of messages. The periodicity with which a microservice queries the events queue 402 may depend on the operating status of the microservice. For example, if a computing device associated with the second microservice 302b has limited free processing resources, it may reduce the frequency with which it queries the events queue 402 both to free additional processing resources associated with such queries as well as because it may lack free processing resources to perform early execution steps.

In step 502, it is determined whether a message indicating an API request (e.g., the API request 301) is in the events queue 402. Some events messages in the events queue 402 may not relate to API requests. For example, the messages may be for other microservice functions, such as causing one or more functions to flush a cache, to delay execution until additional processing resources (e.g., those currently in-use by a particular microservice) become available, or the like. If a message corresponding to an API request (e.g., the API request 301) exists, the flow chart proceeds to step 503. Otherwise, the flow chart restarts at step 501.

In step 503, based on determining the existence of a message indicating an API request, the microservice may determine whether early execution steps are available. Early execution steps may be available based on the content of one or more messages in the events queue 402. For example, the microservice may be able to perform early authentication steps, but only if the messages in the events queue 402 comprise authentication data (e.g., a username and password) necessary for such early authentication steps. Not all API requests may be amenable to early execution steps by all microservices. For example, execution of some microservices may be entirely dependent on output from previous microservices, such that no steps may be performed until an internal message is received from the previous microservices. Determining whether early execution steps are available may comprise selecting early execution steps based on the API request. A microservice may be configured with a plurality of different possible early execution steps, but only a first early execution step of the plurality of possible early execution steps may be selected based on the particular API request made. For example, if an API request relates to authenticating a user with a first service that does not require two-factor authentication, available early execution steps associated with two-factor authentication need not be performed. As another example, if an API request relates to retrieving data, and if the data is uncompressed, available early execution steps associated with uncompressing compressed data need not be performed. If early execution steps are available, the flow chart proceeds to step 504. Otherwise, the flow chart returns to step 501.

In step 504, the early execution steps may be performed. Performing the early execution steps may comprise transmitting one or more new events messages to the events queue 402. After early execution steps are performed by a first microservice, the first microservice may transmit a new events message indicating that the early execution steps have been completed to the events queue 402, and a second microservice may rely on the new events message to perform early execution steps. Microservices in series may execute in parallel based on events messages in the events queue 402. For example, based on an events message (e.g., the events message 403b) in the events queue 402, both the second microservice 302b and the last microservice 302n may perform early execution steps simultaneously. A microservice may wait to perform early execution steps until determining multiple events messages. For example, the last microservice 302n may not perform early execution steps until determining that both the events message 403b and an events message from the second microservice 302b are present in the events queue 402.

Figure 6:
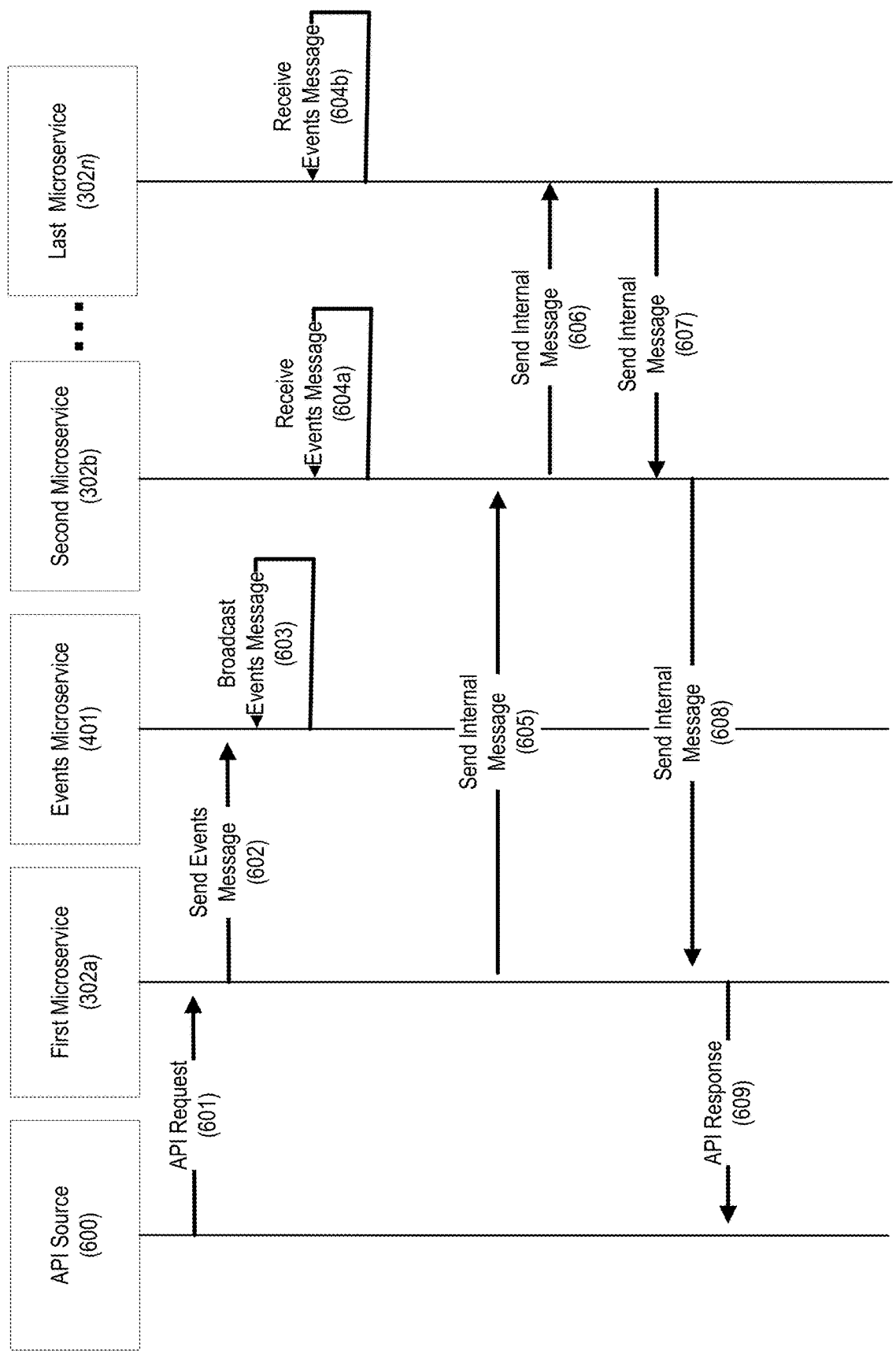
FIG. 6 is a message flow diagram with messages originating from an API source.

FIG. 6 is a message flow diagram involving an API source 600. The API source 600 may be any computing device or set of computing devices configured to transmit API requests (e.g., the API request 301) and/or receive API responses (e.g., the API response 303). In step 601, the API source 600 may transmit an API request, which may be the same as the API request 301, to the first microservice 302a. In step 602, the first microservice 302a may then transmit an events message to the events microservice 401, which may, in step 603, broadcast the events message. The second microservice 302b and other microservices, such as the last microservice 302n, may receive the events message in steps 604a and 604b. Such receipt may be similar to that described in steps 501-504 such that the microservices may perform early execution steps. In step 605, and after processing has been performed by the first microservice 302a, the first microservice 302a may transmit an internal message to the second microservice 302b. In step 606, and after processing has been performed by the second microservice 302b, the second microservice may send an internal message to, e.g., the last microservice 302n. In step 607, and after processing has been performed by the last microservice 302n, the last microservice 302n may transmit an internal message to the second microservice 302b. In step 608, and after additional processing has been performed by the second microservice 302b, the second microservice 302b may transmit an internal message to the first microservice 302a. In step 609, and after any additional processing has been performed by the first microservice 302a, the first microservice 302a may transmit an API response (e.g., the API response 303) to the API source 600.

Figure 7:
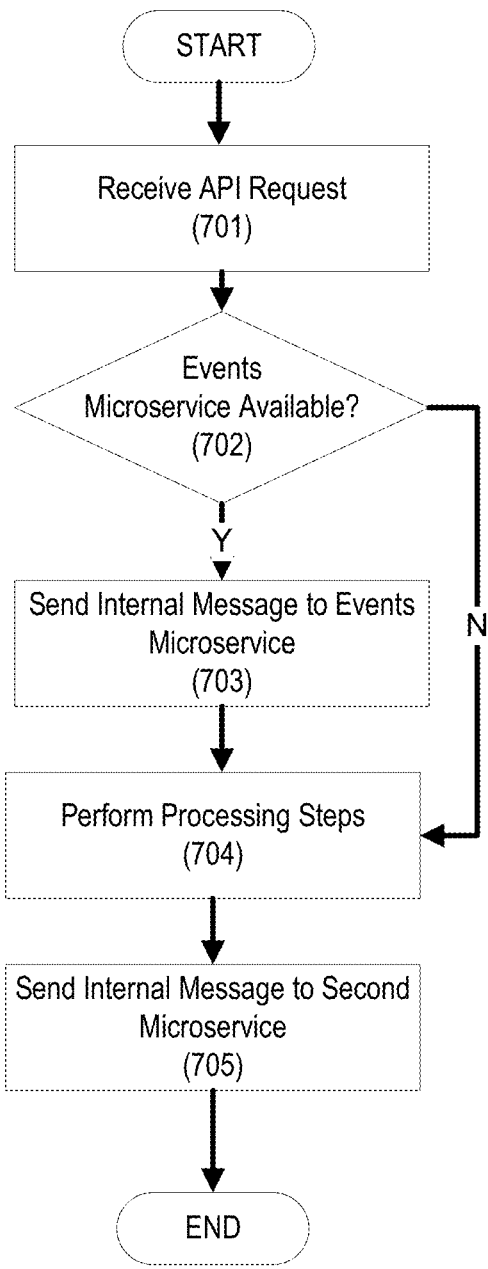
FIG. 7 is a flow chart from the perspective of a first microservice.

FIG. 7 is a flow chart from the perspective of the first microservice 302a. In step 701, the first microservice 302a may receive an API request, such as the API request 302. In step 702, it may be determined whether an events microservice (e.g., the events microservice 401) is available. If so, the flow chart may proceed to step 703; otherwise, the flow chart may proceed to step 704. In step 703, based on determining that the events microservice is available, the first microservice 302a may transmit an events message (e.g., the events message 403a) to the events microservice. In step 704, the first microservice 302a may perform one or more processing steps. In step 705, based on the processing in step 704, the first microservice 302a may transmit an internal message (e.g., the internal message 304a) to the second microservice 302b.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
receiving, by a first microservice executable on a computing device, an application program interface (API) request that initiates execution of the first microservice and a second microservice;
transmitting, by the first microservice, before execution of the first microservice is complete, and in response to receipt of the API request, a first message to a database, the first message comprising data associated with the API request, the first message configured to cause the second microservice to initiate, before receipt of a second message, at least one action to process, based on the data, the received API request so as to reduce time to complete processing of the received API request, and the at least one action comprising caching data to enable processing of the API request; and
transmitting, by the first microservice, and after execution of the first microservice, the second message to the second microservice, the second message to initiate further processing, by the second microservice, of the received API request, and the second microservice having already initiated the at least one action before receiving the second message.

2. The method of claim 1, wherein the first message comprises authentication data, and wherein the at least one action comprises authenticating the second microservice using the authentication data.

3. The method of claim 1, wherein the first message comprises an indication of an account associated with a service, and wherein the at least one action comprises using the indication of the account to retrieve, from the service, data associated with the account.

4. The method of claim 1, wherein transmitting the first message is based on an operating status of the second microservice.

5. The method of claim 1, wherein the first microservice and the second microservice are configured to periodically retrieve messages from the database.

6. The method of claim 1, further comprising:
transmitting, by the first microservice, an API response based on a third message from the second microservice.

7. The method of claim 1, further comprising:
determining a processing time associated with the second microservice, wherein transmitting the first message is based on the processing time satisfying a threshold.

8. A computing device comprising:
one or more processors; and
memory storing instructions that, when executed by the one or more processors, cause the computing device to:
receive an application program interface (API) request configured to initiate execution of the computing device and a second computing device;
transmit, in response to receipt of the API request and before the computing device executes one or more steps associated with the API request, a first message to a database, the first message comprising data associated with the API request, the first message configured to cause the second computing device to initiate, before receipt of a second message, at least one action to process, based on the data, the received API request so as to reduce time to complete processing of the received API request, and the at least one action comprising caching data to enable processing of the API request; and
transmit, after the computing device executes the one or more steps associated with the API request, the second message to the second computing device, the second message to initiate further processing, by the second computing device, of the received API request, and the second computing device having already initiated the at least one action before receiving the second message.

9. The computing device of claim 8, wherein the first message comprises authentication data, and wherein the at least one action comprises authenticating, using the authentication data, the second computing device.

10. The computing device of claim 8, wherein the data is used by the second computing device after the second computing device receives the second message.

11. The computing device of claim 8, wherein the first message comprises an indication of an account associated with a service, wherein the at least one action comprises retrieving data associated with the account from the service, and wherein the data is used by the second computing device after the second computing device receives the second message.

12. The computing device of claim 8, wherein the instructions, when executed by the one or more processors, further cause the computing device to:
receive an operating status of the second computing device, wherein transmitting the first message is based on the operating status.

13. The computing device of claim 8, wherein the second computing device is configured to determine the first message by periodically querying the database for new messages.

14. The computing device of claim 8, wherein the instructions, when executed by the one or more processors, further cause the computing device to:
receive, from the second computing device, an internal API response; and
transmit, based on the internal API response, an API response to a third computing device.

15. The computing device of claim 8, wherein the instructions, when executed by the one or more processors, further cause the computing device to:

determine a processing time associated with the API request, wherein transmitting the first message is based on the processing time exceeding a threshold.

16. A method comprising:

receiving, by a first microservice of a plurality of microservices executable on a computing device, an application program interface (API) request configured to initiate execution of the plurality of microservices;

determining, based on the API request, an estimated processing time associated with execution of the plurality of microservices;

transmitting, by the first microservice, in response to receipt of the API request, and based on the estimated processing time exceeding a threshold, a first message to a database, the first message comprising data associated with the API request, the first message configured to cause a second microservice to initiate, before receipt of a second message, at least one action to process, based on the data, the received API request so as to reduce time to complete processing of the received API request, and the at least one action comprising caching data to enable processing of the API request; and transmitting, by the first microservice and after execution of the first microservice, the second message to the second microservice, the second message to initiate further processing, by the second microservice, of the received API request, and the second microservice having already initiated the at least one action before receiving the second message.

17. The method of claim 16, wherein the first message comprises authentication data, and wherein the at least one action comprises authenticating using the authentication data.

18. The method of claim 16, wherein the first message comprises an indication of an account associated with a service, and wherein the at least one action comprises using the indication of the account to retrieve data associated with the account from the service.

* * * * *